US012789277B2

(12) United States Patent
Yoshikawa

(10) Patent No.: US 12,789,277 B2
(45) Date of Patent: Nov. 10, 2026

(54) SYSTEM FOR MANUFACTURING AN ADDITIVELY-MANUFACTURED OBJECT, METHOD FOR MANUFACTURING AN ADDITIVELY-MANUFACTURED OBJECT, AND NON-TRANSITORY COMPUTER READABLE MEDIUM STORING A MANUFACTURING PROGRAM OF AN ADDITIVELY-MANUFACTURED OBJECT

(71) Applicant: KABUSHIKI KAISHA KOBE SEIKO SHO, Hyogo (JP)

(72) Inventor: Akinori Yoshikawa, Hyogo (JP)

(73) Assignee: KABUSHIKI KAISHA KOBE SEIKO SHO, Hyogo (JP)

( * ) Notice: Subject to any disclaimer, the term of this patent is extended or adjusted under 35 U.S.C. 154(b) by 938 days.

(21) Appl. No.: 18/042,126

(22) PCT Filed: Jul. 21, 2021

(86) PCT No.: PCT/JP2021/027415
§ 371 (c)(1),
(2) Date: Feb. 17, 2023

(87) PCT Pub. No.: WO2022/038961
PCT Pub. Date: Feb. 24, 2022

(65) Prior Publication Data

US 2023/0311227 A1 Oct. 5, 2023

(30) Foreign Application Priority Data

Aug. 19, 2020 (JP) ................................ 2020-138615

(51) Int. Cl.
*B23K 9/04* (2006.01)
*B23K 31/12* (2006.01)
(Continued)

(52) U.S. Cl.
CPC .............. *B23K 9/04* (2013.01); *B23K 31/125* (2013.01); *B33Y 10/00* (2014.12); *B33Y 30/00* (2014.12); *B33Y 50/02* (2014.12); *G01B 11/24* (2013.01)

(58) Field of Classification Search
CPC ......... G01B 11/24; G01B 11/22; B33Y 10/00; B33Y 30/00; B33Y 50/02; B23K 31/125;
(Continued)

(56) References Cited

U.S. PATENT DOCUMENTS

2019/0381595 A1 12/2019 Yamasaki et al.
2020/0130264 A1* 4/2020 Fukase .................... B22F 10/30
(Continued)

FOREIGN PATENT DOCUMENTS

| | | | |
|---|---|---|---|
| CN | 206253789 | U | 6/2017 |
| JP | 2018-079502 | A | 5/2018 |
| JP | 2018-149570 | A | 9/2018 |

*Primary Examiner* — Justin C Dodson
(74) *Attorney, Agent, or Firm* — Studebaker Brackett PLLC

(57) ABSTRACT

A manufacturing system of an additively-manufactured object includes: a torch provided at a robot arm; a measuring unit configured to measure, in a non-contact manner, a shape of a weld bead that is deposited by a shape sensor attached to the torch and output measurement information of at least one of a representative height of the weld bead and a cross-sectional area of the weld bead; a switching unit configured to switch the measurement information output by the measuring unit based on at least one of a shape and position information of a weld bead included in the deposition plan; and a correction unit configured to correct a condition for depositing weld beads based on the measurement information and the deposition plan.

17 Claims, 5 Drawing Sheets

(51) Int. Cl.
*B33Y 10/00* (2015.01)
*B33Y 30/00* (2015.01)
*B33Y 50/02* (2015.01)
*G01B 11/24* (2006.01)

(58) Field of Classification Search
CPC .......... B23K 9/04; B23K 9/042; B23K 9/044; B23K 9/095; B23K 9/0953; B23K 9/0956
See application file for complete search history.

(56) References Cited

U.S. PATENT DOCUMENTS

2020/0156322 A1* 5/2020 Yorozu .................. B33Y 50/02
2020/0368815 A1* 11/2020 Baker ................... B29C 64/364

* cited by examiner (A)

(B)

SYSTEM FOR MANUFACTURING AN ADDITIVELY-MANUFACTURED OBJECT, METHOD FOR MANUFACTURING AN ADDITIVELY-MANUFACTURED OBJECT, AND NON-TRANSITORY COMPUTER READABLE MEDIUM STORING A MANUFACTURING PROGRAM OF AN ADDITIVELY-MANUFACTURED OBJECT

TECHNICAL FIELD

The present invention relates to a manufacturing system of an additively-manufactured object in which weld beads are deposited based on a deposition plan, a manufacturing method of an additively-manufactured object, and a non-transitory computer readable medium storing a manufacturing program of an additively-manufactured object.

BACKGROUND ART

Patent Literature 1 discloses a welding quality determination method capable of determining welding quality of a welded object welded by lap welding, which is non-penetration welding. In this method, welding quality of a welded object in which a first material to be welded and a second material to be welded are joined to each other is determined by irradiating the first material to be welded with laser light in a state where the first material to be welded and the second material to be welded are superimposed. That is, a height of a weld bead formed on a laser-light-irradiated surface of the first material to be welded in a welded portion is obtained, and the welding quality of the welded object is determined based on the obtained height.

Patent Literature 2 discloses a manufacturing method of an additively-manufactured object in which a height of a weld bead of each layer is appropriately controlled in additive manufacturing, the quality of a built object is improved, and interference between the weld bead and an additive device can be prevented. In this method, a welding robot forms and deposits the weld beads of the respective layers such that the heights of the weld beads of the respective layers are within a range of tolerance with respect to a planned height, thereby forming an additively-manufactured object. When the height of the weld bead is smaller than a value obtained by subtracting the tolerance from the planned height, the welding robot further forms another weld bead so as to overlap the weld bead. When the height of the weld bead is greater than a value obtained by adding the tolerance to the planned height, the weld bead is removed by a cutting robot.

CITATION LIST

Patent Literature

Patent Literature 1: JP2018-79502A
Patent Literature 2: JP2018-149570A

SUMMARY OF INVENTION

Technical Problem

As in Patent Literatures 1 and 2, in order to create a built object with high accuracy, it is necessary to control a width or height of each weld bead, and it is desirable to perform feedback control of a shape of a weld bead to be newly formed using information obtained by measuring a shape of an existing weld bead.

For example, in manufacturing a frame portion that forms an outer contour of an additively-manufactured object, position information of several existing weld beads is measured by a laser sensor or the like, and information such as a required welding height can be acquired from the obtained position information. However, depending on the additively-manufactured object, a manufacturing procedure may be that an internal built portion is formed inside the frame portion, and in this case, when measuring position information of the internal built portion, the frame portion becomes an obstacle, making it difficult to measure, and the variation of the obtained position information increases. Therefore, it is difficult to accurately acquire information on a required welding amount from these pieces of information.

Accordingly, an object of the present invention is to provide a manufacturing system of an additively-manufactured object, a manufacturing method of an additively-manufactured object, and a non-transitory computer readable medium storing a manufacturing program of an additively-manufactured object that can always manufacture an additively-manufactured object having a desired shape with high accuracy regardless of a shape of the additively-manufactured object.

SOLUTION TO PROBLEM

The present invention is a manufacturing system of an additively-manufactured object in which weld beads are deposited based on a deposition plan, the manufacturing system including: a torch provided at a robot arm; a measuring unit configured to measure, in a non-contact manner, a shape of a weld bead that is deposited by a shape sensor attached to the torch and output measurement information of at least one of a representative height of the weld bead and a cross-sectional area of the weld bead; a switching unit configured to switch the measurement information output by the measuring unit based on at least one of a shape and position information of a weld bead included in the deposition plan; and a correction unit configured to correct a condition for depositing weld beads based on the measurement information and the deposition plan.

In a case where a width of a weld bead corresponding to a weld bead serving as a base is less than a predetermined first threshold in the shape of a weld bead included in the deposition plan, the switching unit may cause the measuring unit to output the measurement information of the representative height of the weld bead.

In a case where a width of a weld bead serving as a base in the shape of a weld bead included in the deposition plan is equal to or greater than a predetermined first threshold, the switching unit may cause the measuring unit to output the measurement information of the cross-sectional area of the weld bead.

In a case where a cross-sectional area of a weld bead serving as a base in the shape of a weld bead included in the deposition plan is less than a predetermined second threshold, the switching unit may cause the measuring unit to output the measurement information of the representative height of the weld bead.

In a case where a cross-sectional area of a weld bead serving as a base in the shape of a weld bead included in the deposition plan is equal to or greater than a predetermined second threshold, the switching unit may cause the measuring unit to output the measurement information of the cross-sectional area of the weld bead.

When the switching unit switches the measurement information output from the measuring unit to the representative height of the weld bead, the correction unit may adjust at least one of a travel speed or a feeding amount of a filler metal for forming the weld bead or a heat input amount or a weaving condition of the weld bead so as to reduce a difference obtained by comparing the representative height and a corresponding representative height in the deposition plan.

When the switching unit switches the measurement information output from the measuring unit to the cross-sectional area of the weld bead, the correction unit may adjust at least one of a travel speed or a feeding amount of a filler metal for forming the weld bead or a heat input amount or a weaving condition of the weld bead so as to reduce a difference obtained by comparing the cross-sectional area and a corresponding cross-sectional area in the deposition plan.

Further, the present invention is a manufacturing method of an additively-manufactured object in which weld beads are deposited based on a deposition plan, the manufacturing method including: measuring, in a non-contact manner, a shape of a weld bead that is deposited by a measuring unit including a shape sensor attached to a torch provided at a robot arm and outputting measurement information of at least one of a representative height of the weld bead and a cross-sectional area of the weld bead; switching the measurement information output by the measuring unit based on at least one of a shape and position information of a weld bead included in the deposition plan; and correcting a condition for depositing weld beads based on the measurement information and the deposition plan.

Further, the present invention is a non-transitory computer readable medium storing a manufacturing program of an additively-manufactured object for causing a computer to execute a manufacturing method of an additively-manufactured object in which weld beads are deposited based on a deposition plan, the manufacturing program causing the computer to execute: measuring, in a non-contact manner, a shape of the weld bead that is deposited by a measuring unit including a shape sensor attached to a torch provided at a robot arm and outputting measurement information of at least one of a representative height of the weld bead and a cross-sectional area of the weld bead; switching, based on at least one of a shape and position information of a weld bead included in the deposition plan, the measurement information output by the measuring unit; and correcting a condition for depositing weld beads based on the measurement information and the deposition plan.

ADVANTAGEOUS EFFECTS OF INVENTION

According to the present invention, an additively-manufactured object having a desired shape may always be manufactured with high accuracy regardless of a shape of the additively-manufactured object.

DESCRIPTION OF EMBODIMENTS

Hereinafter, embodiments of the present invention will be described in detail with reference to the drawings.

Figure 1:
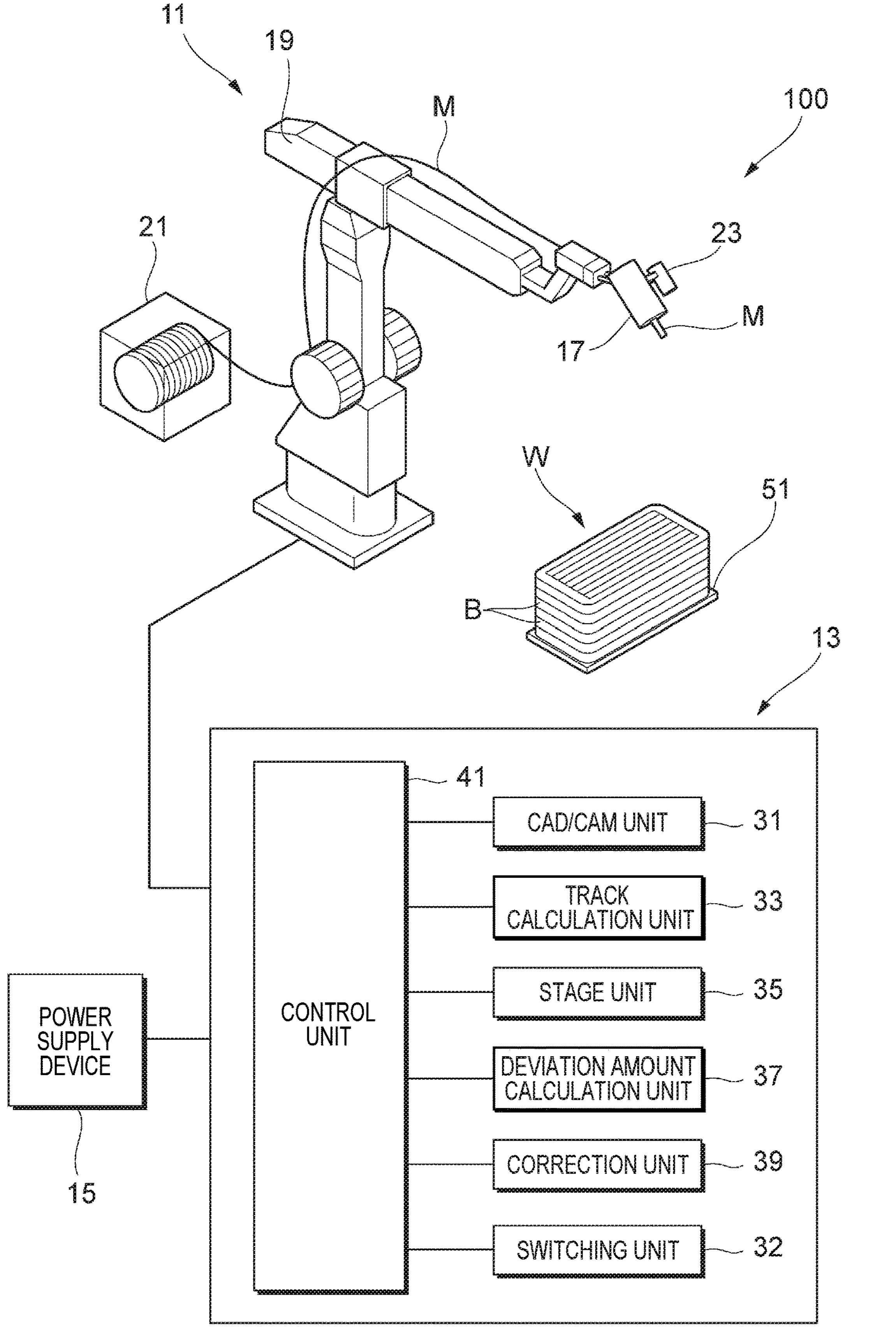
FIG. 1 is a schematic configuration diagram of a manufacturing system for manufacturing an additively-manufactured object by a manufacturing method according to an embodiment of the present invention.

FIG. 1 is a configuration diagram of a manufacturing system used for manufacturing an additively-manufactured object, according to the present invention. A manufacturing system 100 of an additively-manufactured object of the present configuration includes an additive manufacturing device 11, a controller 13 that integrally controls the additive manufacturing device 11, and a power supply device 15.

The additive manufacturing device 11 includes a welding robot 19 in which a torch 17 is provided on a tip shaft, and a filler metal feeding unit 21 that feeds a filler metal (welding wire) M to the torch 17. A shape sensor 23 is provided together with the torch 17 on the tip shaft of the welding robot 19. The output from the shape sensor 23 is sent to a measuring unit (not shown), and the measuring unit outputs a signal corresponding to the output from the shape sensor 23 to the controller 13. The measuring unit generates and outputs measurement information such as a representative height of a weld bead or a cross-sectional area of the weld bead, which will be described in detail later, and may be disposed on the shape sensor 23 side or may be disposed on the controller 13 side.

The welding robot 19 is an articulated robot, and the filler metal M is supported by the torch 17 attached to the tip shaft of a robot arm so as to be continuously fed. A position and posture of the torch 17 can be freely set three-dimensionally within a range of degrees of freedom of the robot arm.

The torch 17 includes a shield nozzle (not shown), and shielding gas is supplied from the shield nozzle. An arc welding method may be either a consumable electrode type such as shielded metal arc welding or carbon dioxide gas arc welding, or a non-consumable electrode type such as TIG welding or plasma arc welding, and is appropriately selected according to an additively-manufactured object to be manufactured.

For example, in the case of the consumable electrode type, a contact tip is disposed inside the shield nozzle, and the filler metal M to which a melting current is supplied is held on the contact tip. The torch 17 generates an arc from a tip of the filler metal M in a shielding gas atmosphere while holding the filler metal M. The filler metal M is fed from the filler metal feeding unit 21 to the torch 17 by a feeding mechanism (not shown) attached to a robot arm or the like. Then, when the continuously fed filler metal M is melted and solidified while moving the torch 17, a linear weld bead B, which is a melted and solidified body of the filler metal M, is formed on a base plate 51, and an additively-manufactured object W formed of the weld bead B is built.

Figure 2:
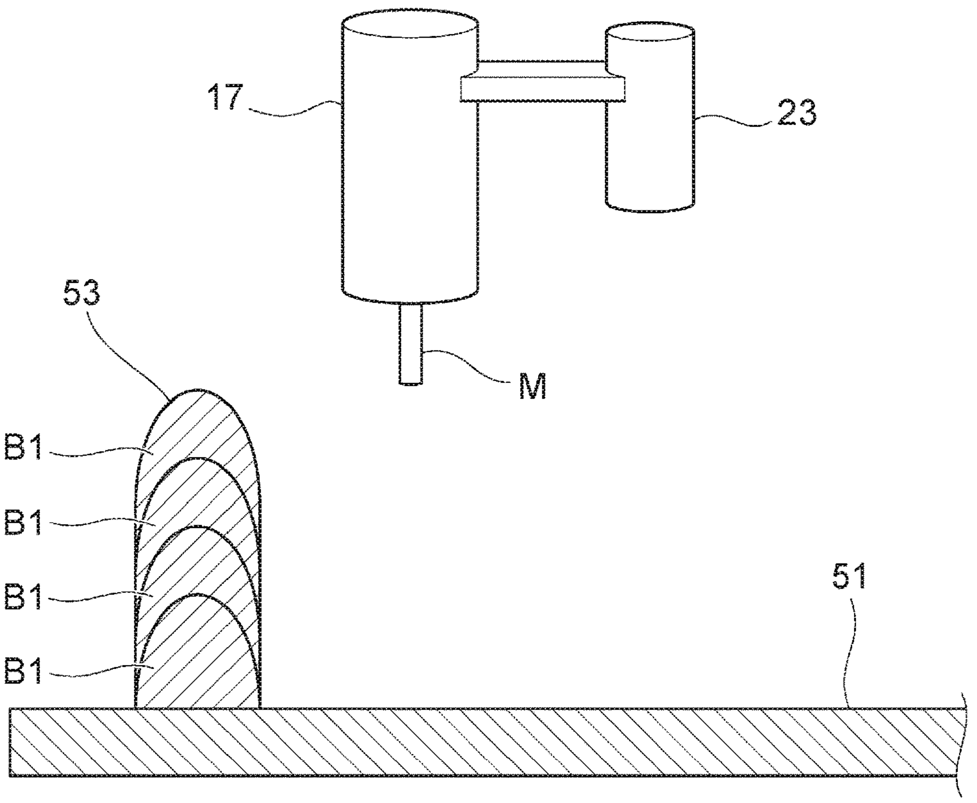
FIG. 2 is a schematic side view illustrating a shape sensor.

As shown in FIG. 2, the shape sensor 23 is arranged side by side with the torch 17, and is moved together with the torch 17. The shape sensor 23 is a non-contact type sensor that measures a shape of a portion serving as a base in forming the weld bead B. As the shape sensor 23, for example, a laser sensor that acquires reflected light of emitted laser light as height data is used. The shape sensor 23 is not limited to a laser sensor, and a sensor of another type such as a camera for three-dimensional shape measurement may be used.

The controller 13 includes a CAD/CAM unit 31, a track calculation unit 33, a storage unit 35, a deviation amount calculation unit 37, a correction unit 39, a switching unit 32, and a control unit 41 to which these units are connected. The controller 13 is implemented by a computer device including a CPU, a memory, a storage, and the like.

The CAD/CAM unit 31 inputs or creates shape data (CAD data and the like) of the additively-manufactured object W to be manufactured.

The track calculation unit 33 disassembles a shape model of three-dimensional shape data into a plurality of weld bead layers according to a height of the weld bead B. Then, for each layer of the disassembled shape model, a deposition plan is created which defines a track of the torch 17 for forming the weld bead B and heating conditions for forming the weld bead B (including welding conditions for obtaining a bead width, a bead depositing height, and the like).

The deviation amount calculation unit 37 compares the deposition plan generated by the track calculation unit 33 with a measured value obtained by the shape sensor 23. Then, the deviation amount calculation unit 37 calculates a deviation amount between a shape based on the deposition plan and a shape based on the measured value in the portion serving as the base in forming the weld bead B.

The correction unit 39 corrects, based on the deviation amount calculated by the deviation amount calculation unit 37, a welding condition based on the deposition plan for forming the weld bead B.

The switching unit 32 switches the measurement information output by the shape sensor 23 based on at least one of a shape and position information of a weld bead included in the deposition plan. The switching is performed between a representative height of a weld bead B2 and a cross-sectional area of the weld bead B2. The shape sensor 23 directly measures, using a medium such as a laser beam, the shape (base shape) of the base portion serving as a base in forming the weld bead B in a non-contact manner.

The control unit 41 executes a manufacturing program stored in the storage unit 35 to drive the welding robot 19, the power supply device 15, and the like. That is, the welding robot 19 moves the torch 17 in response to a command from the controller 13 and melts the filler metal M with an arc to form the weld bead B on the base plate 51.

The base plate 51 is made of a metal plate such as a steel plate, and is basically larger than a bottom surface (a surface of a lowermost layer) of the additively-manufactured object W. The base plate 51 is not limited to a plate shape, and may be a base of another shape such as a block body or a rod body.

Any commercially available welding wire can be used as the filler metal M. For example, it is possible to use wires specified by MAG welding and MIG welding solid wires (JIS Z3312) for mild steel, high tensile steel, and cryogenic steel, arc welding flux-cored wires (JIS Z3313) for mild steel, high tensile steel, and cryogenic steel, and the like.

Figure 3:
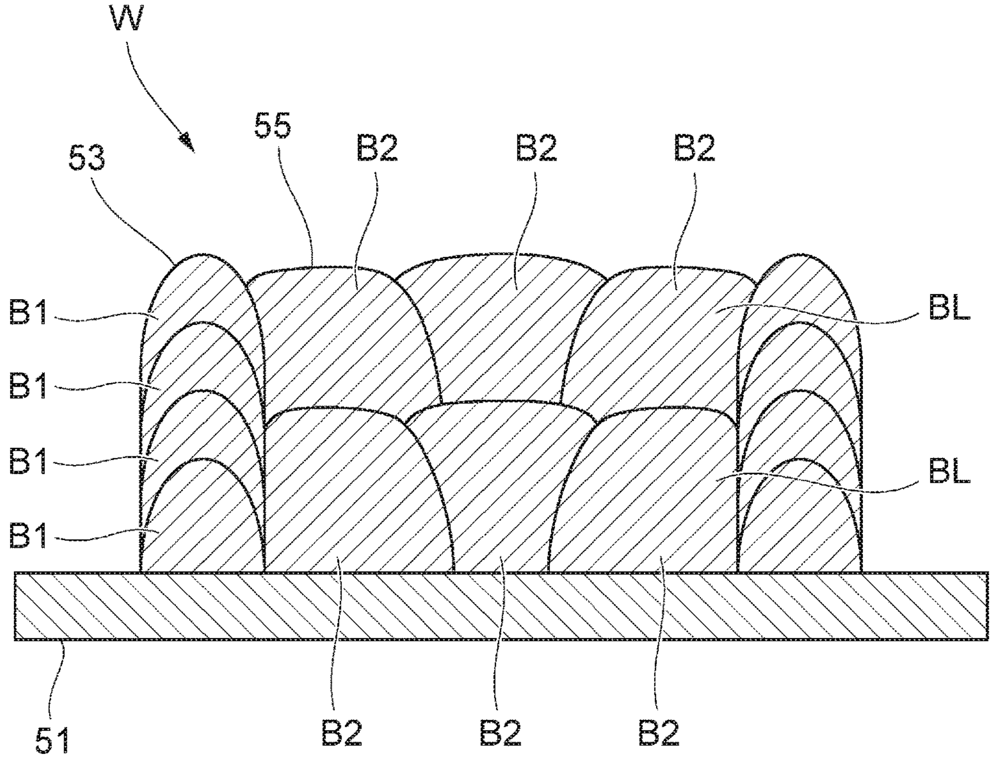
FIG. 3 is a schematic cross-sectional view of an additively-manufactured object showing an example of the additively-manufactured object.

Next, an example of an additively-manufactured object manufactured by a manufacturing method according to the present embodiment will be described. FIG. 3 is a schematic cross-sectional view of the additively-manufactured object W showing an example of the additively-manufactured object W.

As shown in FIG. 3, the additively-manufactured object W includes a frame portion 53 built by depositing weld beads B1 on the base plate 51. Further, the additively-manufactured object W includes an internal built portion 55 built by the weld beads B2 inside the frame portion 53. The internal built portion 55 is formed by depositing weld bead layers BL formed of the weld beads B2.

Next, a case of building the additively-manufactured object W will be described. The filler metal M is melted while the torch 17 of the additive manufacturing device 11 is moved by driving the welding robot 19. Then, the weld beads B1 made of the melted filler metal M are supplied and deposited on the base plate 51 to build the frame portion 53 having a substantially rectangular shape in plan view formed of the weld beads B1 deposited on the base plate 51.

The weld beads B2 are formed inside the frame portion 53. Then, the weld beads B2 are formed in a width direction in the frame portion 53. Thus, the weld bead layer BL including a plurality of weld beads B2 formed in parallel is formed in the frame portion 53. Then, the weld bead layers BL are deposited inside the frame portion 53 to build the internal built portion 55.

According to this manufacturing method, since the internal built portion 55 is built inside the frame portion 53 after the frame portion 53 is built, the internal built portion 55 can be efficiently built by the weld bead B2 having a large cross-sectional area.

In order to create an additively-manufactured object with high accuracy, it is necessary to control a width or height of each weld bead, and a feedback control method of a shape of a weld bead using output information from a laser sensor has been proposed. Among additively-manufactured objects, for example, in the building of the frame portion 53, information such as a required welding height can be acquired based on position information of several points to be extracted. However, in the building of the internal built portion 55, pieces of position information of several points have a large variation, and it is difficult to acquire the information of a necessary welding amount based on these pieces of information.

Figure 4:
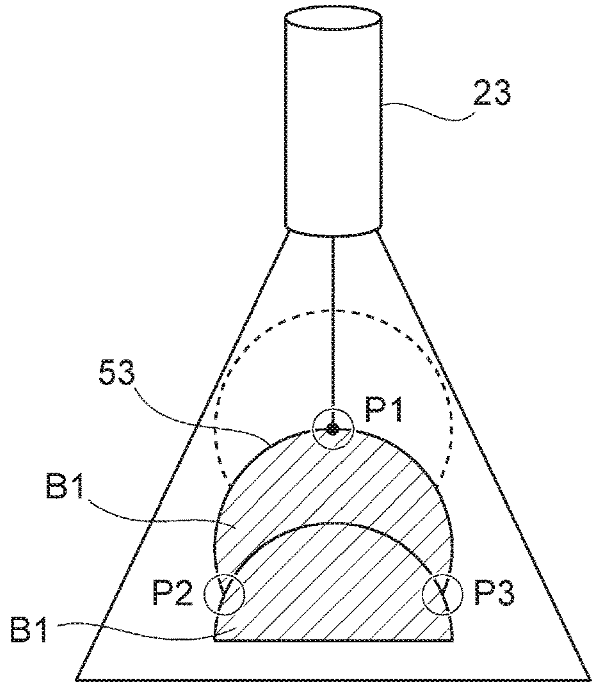
FIG. 4 is a diagram conceptually showing an operation of the shape sensor when manufacturing an additively-manufactured object, (A) in FIG. 4 is a conceptual diagram of a case of building a frame portion, and (B) in FIG. 4 is a conceptual diagram of a case of building an internal built portion.
Figure 4:
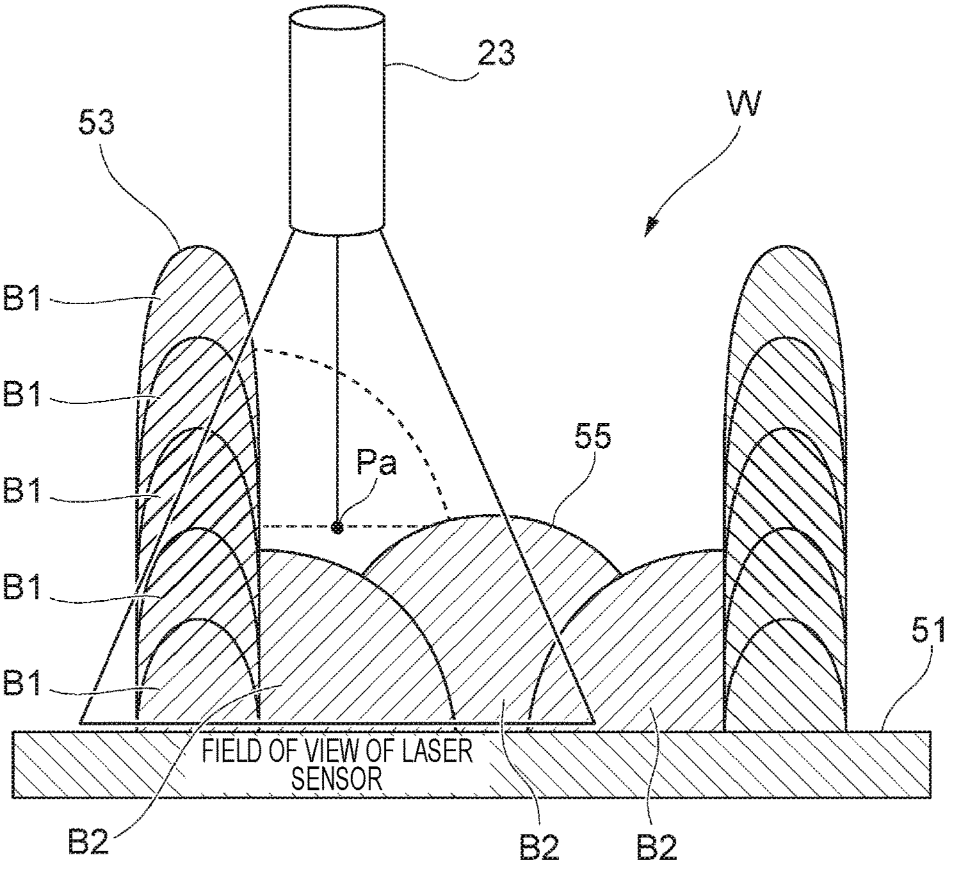

For example, in the case of depositing the frame portion 53 of the additively-manufactured object W shown in (A) in FIG. 4, the shape sensor 23 acquires a shape measurement profile, and can acquire a height of the base based on coordinates corresponding to a center point P1 and measure a width of the weld bead B1 based on coordinates of two left and right points P1 and P2. The shape sensor 23 can measure the representative height per layer of the weld bead B1 based on the coordinates of the center point P1 and the two left and right points P2 and P3. The representative height of the weld bead B1 can be expressed as, for example, a median height between the height of the point P1 and an average height of the points P2 and P3. Here, both a width of a weld bead and a representative height of the weld bead represent a shape in a cross section orthogonal to a longitudinal direction of the weld bead.

The control unit 41 of the manufacturing system 100 of an additively-manufactured object can automatically recognize whether each pass at the time of building corresponds to the deposition of the frame portion 53 by giving attributes based on the bead width, a cross-sectional area of welding, or the like of the weld bead B1 at each position in the deposition plan. Since the shape accuracy is given priority in the building of the frame portion 53, when deviated from the deposition plan, a height of a weld bead is adjusted while the bead width is maintained within a predetermined range.

On the other hand, in the building of the internal built portion 55 shown in (B) in FIG. 4, it is difficult to extract a representative value of a height of a portion filled inside the frame portion 53 in plan view. A periphery of the internal built portion 55 may be covered with the frame portion 53 for increasing the building efficiency (quickly filling up a building region), and the shape accuracy of the inside of the internal built portion 55 is not required as much as that of the frame portion 53. Therefore, when filling the internal built portion 55, it is sufficient to obtain a cross-sectional area required for filling.

Therefore, a shape profile corresponding to weld bead cross sections of existing weld beads (weld beads indicated by diagonal lines) shown in (B) in FIG. 4 is acquired, and the shape profile and the deposition plan are compared to obtain a target position Pa of the weld bead B2 to be formed next. Then, it is desirable to calculate a shape of a cross section that can be filled by a weld bead to be formed next with the target position Pa as a base point, and monitor a difference (insufficiency) from a shape of a planned cross section in the deposition plan. In the calculation of the shape of the fillable cross section, for example, an arc or the like having a predetermined size simulating a part of a cross-sectional shape of a weld bead may be used, and a region surrounded by the arc may be obtained by superimposing the arc on the shape profile.

In order for the control unit 41 to identify the timing at which the internal built portion 55 is to be built, predetermined attributes are given to a bead width, the cross-sectional area of welding, a weaving operation, and the like of the weld bead B2 at each position on the deposition plan. In this way, it is possible to automatically recognize whether each pass at the time of building corresponds to the deposition of the internal built portion 55. For example, it may be determined that the building of the internal built portion 55 is performed when the weaving operation is performed, and the building of the frame portion 53 is performed when the weaving operation is not performed.

That is, in the building of the internal built portion 55, since the prevention of unwelded defects and a filling amount are more important than the shape accuracy, the amount of the cross-sectional area of welding is adjusted when deviated from the deposition plan.

Figure 5:
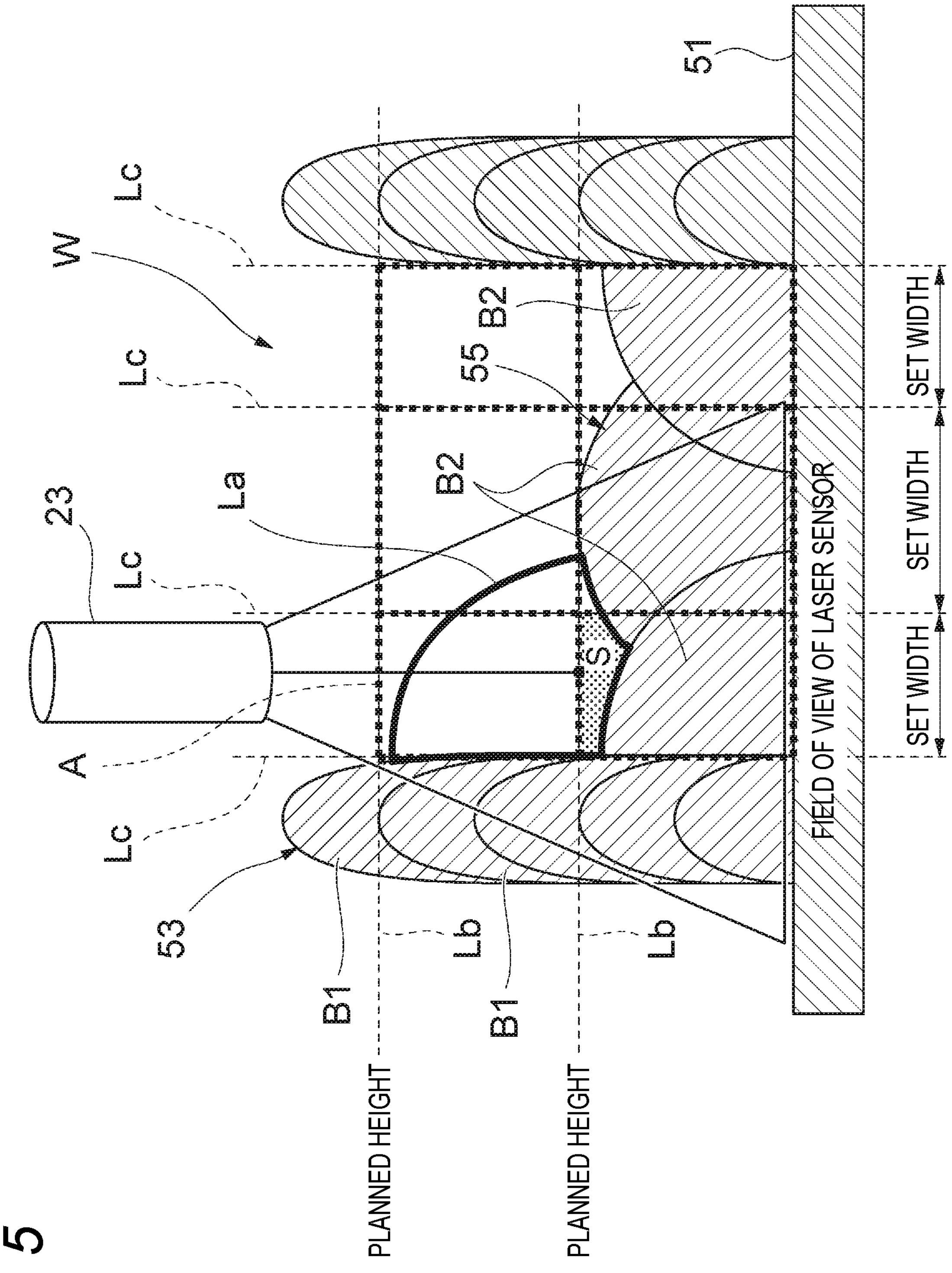
FIG. 5 is a conceptual diagram showing a concept of calculating a cross-sectional area of welding in the building of the internal built portion.

FIG. 5 shows a concept of calculating a differential cross-sectional area S corresponding to a difference between the shape of the fillable cross section and the shape of the planned cross section described above in the building of the internal built portion 55. The differential cross-sectional area (insufficient filling area) S in this example may be obtained as a region corresponding to a difference (insufficient portion) between a measured shape profile and the shape (for example, a rectangular shape) of the planned cross section in a deposition plan surrounded by a set width and a planned height.

Specifically, in FIG. 5, a region surrounded by thick curves La corresponds to the shape of the fillable cross section, a rectangular portion surrounded by thick dotted lines (lines Lb representing the planned height, and lines Lc representing both ends of the set width) is the shape of the planned cross section of one section, and a cross-sectional area of the one section is a planned cross-sectional area A.

A region indicated by dot hatching corresponds to the differential cross-sectional area S. That is, a planned height to be filled with the base plate 51 as a reference is an upper side of the region of the differential cross-sectional area, and an upper surface of the existing weld bead B2 is a lower side of the region of the differential cross-sectional area. A boundary line between a weld bead to be formed next and another weld bead adjacent to a formation position of the weld bead to be formed next is one side of the region of the differential cross-sectional area, and a boundary line representing a set width of the weld bead to be formed next is the other side of the region of the differential cross-sectional area. In this way, the differential cross-sectional area S is obtained. The set width shown here is freely set according to the deposition plan, and the differential cross-sectional area S is obtained for each pass of weld beads.

As described above, a measuring unit measures a shape of the deposited weld bead B2 by the shape sensor 23 in a non-contact manner, and outputs measurement information of at least one of a representative height of the weld bead B2 and a cross-sectional area of a shape of a fillable cross section (a cross-sectional area of a weld bead). The representative height may be measured by, for example, the method shown in (A) in FIG. 4, and the fillable cross-sectional area may be measured by, for example, the method shown in (B) in FIG. 4. The switching unit 32 switches and outputs either the representative height of the weld bead B2 or a cross-sectional area of the weld bead B2 of the measurement information output by the shape sensor 23, based on at least one of a shape and position information of a weld bead included in a deposition plan. The correction unit 39 corrects conditions for depositing the weld beads B2 based on the measurement information and the deposition plan. Therefore, the correction unit 39 may perform the correction control suitable for situations by appropriately correcting conditions for depositing weld beads according to a shape of a portion to be built.

When a width of a weld bead in the shape of the weld bead included in the deposition plan is less than a predetermined first threshold, the switching unit 32 preferably causes the shape sensor 23 to output measurement information of a representative height of a weld bead serving as a base. When the width of the weld bead serving as a base is less than the first threshold, it can be estimated that the weld bead is used to form the frame portion 53. Since the switching unit 32 switches the measurement information output from the shape sensor 23 to the representative height, the weld beads B1 may be further deposited using the representative height of the weld bead serving as a base, which is particularly important in the deposition of the frame portion 53. Therefore, even if there is an excess or deficiency in a welding height of the weld bead serving as a base, the frame portion 53 may be accurately built.

On the other hand, when a width of a weld bead serving as a base in the shape of a weld bead included in the deposition plan is equal to or greater than the predetermined first threshold, the switching unit 32 preferably causes the shape sensor 23 to output measurement information of a cross-sectional area of the weld bead. When the width of the weld bead serving as a base is equal to or greater than the first threshold, it can be estimated that the weld bead is used to form the internal built portion 55. Since the switching unit 32 switches the measurement information output from the shape sensor 23 to the cross-sectional area, the weld beads B2 may be further deposited using the cross-sectional area of the weld bead serving as a base, which is particularly important in the deposition of the internal built portion 55. Therefore, even if there is an excess or deficiency in a volume of the weld bead serving as a base, a welding amount necessary for filling in the internal built portion 55 may be accurately recognized. That is, even if the above differential cross-sectional area S is generated, the welding amount may be increased so as to fill the differential cross-sectional area S.

When a cross-sectional area of the weld bead serving as a base in the shape of a weld bead included in the deposition plan is less than a predetermined second threshold, the switching unit 32 preferably causes the shape sensor 23 to output the measurement information of the representative height of the weld bead serving as a base. When the width of the weld bead serving as a base is less than the second threshold, it can be estimated that the weld bead is used to form the frame portion 53. Since the switching unit 32 switches the measurement information output from the shape sensor 23 to the representative height, the weld beads B1 may be further deposited using the representative height of the weld bead serving as a base, which is particularly important in the deposition of the frame portion 53. Therefore, even if there is an excess or deficiency in the welding height of the weld bead serving as a base, the frame portion 53 may be accurately built.

On the other hand, when the cross-sectional area of the weld bead serving as a base in the shape of a weld bead included in the deposition plan is equal to or greater than the predetermined second threshold, the switching unit 32 preferably causes the shape sensor 23 to output the measurement information of the cross-sectional area of the weld bead. When the cross-sectional area of the weld bead serving as a base is equal to or greater than the second threshold, it can be estimated that the weld bead is used to form the internal built portion 55. Since the switching unit 32 switches the measurement information output from the shape sensor 23 to the cross-sectional area of the weld bead, the weld beads B2 may be further deposited using the cross-sectional area of the weld bead serving as a base, which is particularly important in the deposition of the internal built portion 55. Therefore, even if there is an excess or deficiency in the volume of the weld bead serving as a base, the welding amount necessary for filling in the internal built portion 55 may be accurately recognized.

When the switching unit 32 switches the measurement information output from the shape sensor 23 to the representative height, the correction unit 39 preferably adjusts at least one of a travel speed or a feeding amount of a filler metal for forming the weld bead B1 or a heat input amount or a weaving condition of the weld bead B1 so as to reduce a difference obtained by comparing the representative height and a corresponding representative height in the deposition plan. The excess or deficiency of the welding height may be flexibly dealt with, and in particular, deviation of the height of the frame portion 53 from the deposition plan may be precisely corrected in the deposition of the frame portion 53.

When the switching unit 32 switches the measurement information output from the shape sensor 23 to the cross-sectional area, the correction unit 39 preferably adjusts at least one of a travel speed or a feeding amount of a filler metal for forming the weld bead B2 or a heat input amount or a weaving condition of the weld bead B2 so as to reduce a difference obtained by comparing the cross-sectional area and a corresponding cross-sectional area in the deposition plan. The excess or deficiency of the welding volume may be flexibly dealt with, and in particular, deviation of the welding amount from the deposition plan may be precisely corrected in the internal built portion 55.

Figure 6:
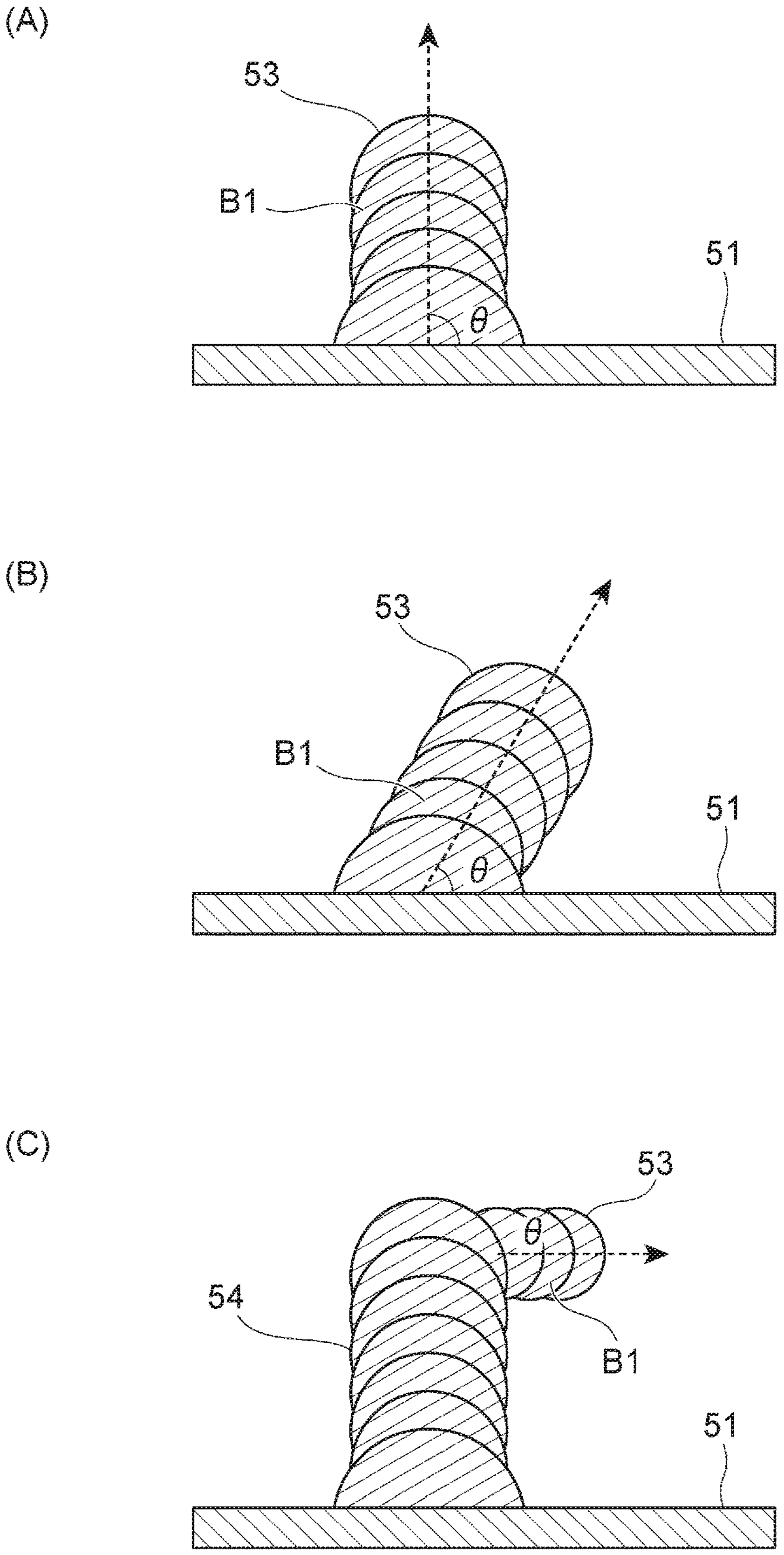
FIG. 6 is a diagram showing various forms of the frame portion, (A) in FIG. 6 is a cross-sectional view showing a general frame portion, (B) in FIG. 6 is a cross-sectional view showing an inclined frame portion, and (C) in FIG. 6 is a cross-sectional view showing a frame portion extending horizontally.

(A) to (C) in FIG. 6 show various aspects of the frame portion 53, in which (A) shows a general frame portion 53 extending vertically from the base plate 51, (B) shows a frame portion 53 (including an overhang) extending obliquely from the base plate 51 and inclined, and (C) shows a frame portion 53 bent and extending from another frame portion 54 and forming, for example, a ceiling of a flow path. In each of the frame portions 53, the shape sensor 23 preferably measures the representative height of the weld bead B1 in consideration of an inclination θ in a depositing direction in which the weld beads B1 are deposited. In (A) in FIG. 6, the inclination θ is 90°, in (B) in FIG. 6, 0°<θ<90°, and in (C) in FIG. 6, the inclination θ is 0°. In particular, in the case shown in (C), the weld beads B1 are deposited in a horizontal direction such that the frame portion 53 is parallel to the base plate 51. Therefore, in this case, the horizontal direction is a direction of the height described above, and the representative height is also measured along the horizontal direction.

The present invention is not limited to the above embodiment, and may be appropriately modified, improved, or the like. Materials, shapes, sizes, numerical values, forms, numbers, arrangement positions, and the like of components in the above embodiment are set as desired and not limited as long as the present invention can be achieved.

The present application is based on Japanese patent application (Japanese Patent Application No. 2020-138615) filed on Aug. 19, 2020, and contents thereof are incorporated herein by reference.

REFERENCE SIGNS LIST

17 torch
23 shape sensor (measuring unit)
32 switching unit
41 control unit
25 53 frame portion
55 internal built portion
B, B1, B2 weld bead
BL weld bead layer
M filler metal
30 W additively-manufactured object

The invention claimed is:

1. A manufacturing system of an additively-manufactured object in which weld beads are deposited based on a deposition plan, the manufacturing system comprising:

a torch provided at a robot arm;

a measuring unit configured to measure, in a non-contact manner, a shape of a weld bead by a shape sensor attached to the torch and output measurement information of at least one of a representative height of the weld bead and a cross-sectional area of the weld bead;

a switching circuit configured to switch the type of measurement information selected between the representative height of the weld bead and the cross-sectional area of the weld bead output by the measuring unit based on at least one of a shape and position information of a weld bead included in the deposition plan; and a correction circuit configured to correct a condition for depositing weld beads based on the measurement information and the deposition plan.

2. The manufacturing system of an additively-manufactured object according to claim 1, wherein, in a case where a width of a weld bead corresponding to a weld bead serving as a base is less than a predetermined first threshold in the shape of a weld bead included in the deposition plan, the switching circuit causes the measuring unit to output the measurement information of the representative height of the weld bead.

3. The manufacturing system of an additively-manufactured object according to claim 1, wherein, in a case where a width of a weld bead serving as a base in the shape of a weld bead included in the deposition plan is equal to or greater than a predetermined first threshold, the switching circuit causes the measuring unit to output the measurement information of the cross-sectional area of the weld bead.

4. The manufacturing system of an additively-manufactured object according to claim 1, wherein, in a case where a cross-sectional area of a weld bead serving as a base in the shape of a weld bead included in the deposition plan is less than a predetermined second threshold, the switching circuit causes the measuring unit to output the measurement information of the representative height of the weld bead.

5. The manufacturing system of an additively-manufactured object according to claim 1, wherein, in a case where a cross-sectional area of a weld bead serving as a base in the shape of a weld bead included in the deposition plan is equal to or greater than a predetermined second threshold, the switching circuit causes the measuring unit to output the measurement information of the cross-sectional area of the weld bead.

6. The manufacturing system of an additively-manufactured object according to claim 1, wherein, when the switching circuit switches the measurement information output from the measuring unit to the representative height of the weld bead, the correction circuit adjusts at least one of a travel speed or a feeding amount of a filler metal for forming the weld bead or a heat input amount or a weaving condition of the weld bead so as to reduce a difference obtained by comparing the representative height and a corresponding representative height in the deposition plan.

7. The manufacturing system of an additively-manufactured object according to claim 1, wherein, when the switching circuit switches the measurement information output from the measuring unit to the cross-sectional area of the weld bead, the correction circuit adjusts at least one of a travel speed or a feeding amount of a filler metal for forming the weld bead or a heat input amount or a weaving condition of the weld bead so as to reduce a difference obtained by comparing the cross-sectional area and a corresponding cross-sectional area in the deposition plan.

8. The manufacturing system of an additively-manufactured object according to claim 3, wherein, when the switching circuit switches the measurement information output from the measuring unit to the cross-sectional area of the weld bead, the correction circuit adjusts at least one of a feeding amount or a welding speed of a filler metal for forming the weld bead or a heat input amount or a weaving condition of the weld bead so as to reduce a difference obtained by comparing the cross-sectional area and a corresponding cross-sectional area in the deposition plan.

9. The manufacturing system of an additively-manufactured object according to claim 5, wherein, when the switching circuit switches the measurement information output from the measuring unit to the cross-sectional area of the weld bead, the correction circuit adjusts at least one of a travel speed or a feeding amount of a filler metal for forming the weld bead or a heat input amount or a weaving condition of the weld bead so as to reduce a difference obtained by comparing the cross-sectional area and a corresponding cross-sectional area in the deposition plan.

10. A manufacturing method of an additively-manufactured object in which weld beads are deposited based on a deposition plan, the manufacturing method comprising:

measuring, in a non-contact manner, a shape of a weld bead by a measuring unit including a shape sensor attached to a torch provided at a robot arm and outputting measurement information of at least one of a representative height of the weld bead and a cross-sectional area of the weld bead;

switching the measurement information selected between the representative height of the weld bead and the cross-sectional area of the weld bead output by the measuring unit based on at least one of a shape and position information of a weld bead included in the deposition plan; and correcting a condition for depositing weld beads based on the measurement information and the deposition plan.

11. A non-transitory computer readable medium storing a manufacturing program of an additively-manufactured object for causing a computer to execute a manufacturing method of an additively-manufactured object in which weld beads are deposited based on a deposition plan, the manufacturing program causing the computer to execute:

measuring, in a non-contact manner, a shape of the weld bead by a measuring unit including a shape sensor attached to a torch provided at a robot arm and outputting measurement information of at least one of a representative height of the weld bead and a cross-sectional area of the weld bead;

switching, based on at least one of a shape and position information of a weld bead included in the deposition plan, the measurement information selected between the representative height of the weld bead and the cross-sectional area of the weld bead output by the measuring unit; and correcting a condition for depositing weld beads based on the measurement information and the deposition plan.

12. The manufacturing system of an additively-manufactured object according to claim 2, wherein, in a case where the width of a weld bead serving as a base in the shape of a weld bead included in the deposition plan is equal to or greater than a predetermined first threshold, the switching circuit causes the measuring unit to output the measurement information of the cross-sectional area of the weld bead.

13. The manufacturing system of an additively-manufactured object according to claim 4, wherein, in a case where the cross-sectional area of a weld bead serving as a base in the shape of a weld bead included in the deposition plan is equal to or greater than a predetermined second threshold, the switching circuit causes the measuring unit to output the measurement information of the cross-sectional area of the weld bead.

14. The manufacturing system of an additively-manufactured object according to claim 2, wherein, when the switching circuit switches the measurement information output from the measuring unit to the representative height of the weld bead, the correction circuit adjusts at least one of a travel speed or a feeding amount of a filler metal for forming the weld bead or a heat input amount or a weaving condition of the weld bead so as to reduce a difference obtained by comparing the representative height and a corresponding representative height in the deposition plan.

15. The manufacturing system of an additively-manufactured object according to claim 4, wherein, when the switching circuit switches the measurement information output from the measuring unit to the representative height of the weld bead, the correction circuit adjusts at least one of a travel speed or a feeding amount of a filler metal for forming the weld bead or a heat input amount or a weaving condition of the weld bead so as to reduce a difference obtained by comparing the representative height and a corresponding representative height in the deposition plan.

16. The manufacturing system of an additively-manufactured object according to claim 12, wherein, when the switching circuit switches the measurement information output from the measuring unit to the cross-sectional area of the weld bead, the correction circuit adjusts at least one of a travel speed or a feeding amount of a filler metal for forming the weld bead or a heat input amount or a weaving condition of the weld bead so as to reduce a difference obtained by comparing the cross-sectional area and a corresponding cross-sectional area in the deposition plan.

17. The manufacturing system of an additively-manufactured object according to claim 13, wherein, when the switching circuit switches the measurement information output from the measuring unit to the cross-sectional area of the weld bead, the correction circuit adjusts at least one of a travel speed or a feeding amount of a filler metal for forming the weld bead or a heat input amount or a weaving condition of the weld bead so as to reduce a difference obtained by comparing the cross-sectional area and a corresponding cross-sectional area in the deposition plan.

* * * * *